(12) United States Patent
Yanagisawa et al.

(10) Patent No.: US 7,218,166 B2
(45) Date of Patent: May 15, 2007

(54) CURRENT STABILIZATION CIRCUIT, CURRENT STABILIZATION METHOD, AND SOLID-STATE IMAGING APPARATUS

(75) Inventors: Makoto Yanagisawa, Kawasaki (JP); Jun Funakoshi, Kawasaki (JP); Seiji Yamagata, Kawasaki (JP); Toshitaka Mizuguchi, Kawasaki (JP); Tsuyoshi Higuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 63 days.

(21) Appl. No.: 10/991,400

(22) Filed: Nov. 19, 2004

(65) Prior Publication Data
US 2006/0001476 A1    Jan. 5, 2006

(30) Foreign Application Priority Data
Jul. 2, 2004    (JP)    ............... 2004-196964

(51) Int. Cl.
*G05F 1/10*    (2006.01)
(52) U.S. Cl. .................. 327/538; 327/539; 327/540; 327/541; 327/542; 327/543; 348/294; 348/308; 348/311
(58) Field of Classification Search ......... 327/538–543
See application file for complete search history.

(56) References Cited

U.S. PATENT DOCUMENTS

| | | | |
|---|---|---|---|
| 4,567,444 A | 1/1986 | Okanobu | 330/257 |
| 5,168,210 A | 12/1992 | Thus | 323/313 |
| 5,774,013 A * | 6/1998 | Groe | 327/543 |
| 5,804,956 A * | 9/1998 | Pulvirenti | 323/277 |
| 5,933,051 A | 8/1999 | Tsuchida et al. | 327/543 |
| 6,064,274 A * | 5/2000 | Nayebi et al. | 331/17 |
| 6,188,268 B1 * | 2/2001 | Nayebi et al. | 327/538 |
| 6,232,756 B1 | 5/2001 | Kurihara | 323/313 |
| 6,271,716 B1 * | 8/2001 | Nayebi et al. | 327/538 |
| 6,337,596 B1 * | 1/2002 | Shimozono | 327/538 |
| 6,452,632 B1 | 9/2002 | Umeda et al. | 348/294 |
| 6,667,653 B2 * | 12/2003 | Kronmueller et al. | 327/538 |
| 6,903,771 B2 * | 6/2005 | Sakuragi | 348/308 |
| 6,952,228 B2 * | 10/2005 | Yoneda et al. | 348/308 |
| 2002/0067416 A1* | 6/2002 | Yoneda et al. | 348/304 |
| 2002/0171102 A1* | 11/2002 | Shizukuishi | 257/315 |
| 2003/0150976 A1* | 8/2003 | Mabuchi | 250/208.1 |
| 2004/0182927 A1* | 9/2004 | Nasu | 235/454 |

(Continued)

FOREIGN PATENT DOCUMENTS

| | | |
|---|---|---|
| JP | 11-161353 | 6/1999 |
| JP | 2002-074997 | 3/2002 |
| KR | 1997-12685 | 3/1997 |
| KR | 134661 | 4/1998 |

*Primary Examiner*—Tuan T. Lam
*Assistant Examiner*—Hiep Nguyen
(74) *Attorney, Agent, or Firm*—Arent Fox LLP.

(57) ABSTRACT

A circuit for stabilizing an electric current includes a constant voltage supplying circuit configured to supply a constant voltage, and a current generating circuit coupled to the constant voltage supplying circuit to generate an electric current based on a predetermined voltage responsive to the constant voltage and to adjust a current amount of the electric current to a predetermined amount by feedback control based on comparison of the predetermined voltage with a voltage appearing across a predetermined resistance responsive to the electric current.

9 Claims, 5 Drawing Sheets

U.S. PATENT DOCUMENTS

| | | |
|---|---|---|
| 2005/0110719 A1* | 5/2005 | Satoh et al. .................... 345/76 |
| 2005/0195304 A1* | 9/2005 | Nitta et al. ................... 348/308 |
| 2005/0270385 A1* | 12/2005 | Shioya et al. ................ 348/239 |
| 2005/0280730 A1* | 12/2005 | Lim et al. .................... 348/308 |
| 2006/0237751 A1* | 10/2006 | Morimoto et al. ........... 257/232 |
| 2006/0243891 A1* | 11/2006 | Shah ......................... 250/208.1 |
| 2006/0266923 A1* | 11/2006 | Mabuchi ................... 250/208.1 |
| 2006/0284999 A1* | 12/2006 | Muramatsu et al. ......... 348/308 |

* cited by examiner

CURRENT STABILIZATION CIRCUIT, CURRENT STABILIZATION METHOD, AND SOLID-STATE IMAGING APPARATUS

CROSS-REFERENCE TO RELATED APPLICATIONS

The present application is based upon and claims the benefit of priority from the prior Japanese Patent Application No. 2004-196964 filed on Jul. 2, 2004, with the Japanese Patent Office, the entire contents of which are incorporated herein by reference.

BACKGROUND OF THE INVENTION

1. Field of the Invention

The present invention generally relates to current stabilization circuits, current stabilization methods, and solid-state imaging apparatuses, and particularly relates to a current stabilization circuit, a current stabilization method, and a solid-state imaging apparatus using such a current stabilization circuit wherein the current stabilization circuit can supply a stable electric current irrespective of the threshold voltage of a transistor, the power supply voltage, and operating temperature.

2. Description of the Related Art

FIG. 1 is a circuit diagram showing an example of the construction of a related-art current amplification circuit. The current amplification circuit 10 of FIG. 1 includes transistors 11 through 15 and a resistor 16. The transistors 11 and the resistor 16 are connected in series, and a joint point between the transistor 11 and the resistor 16 is connected to both the gate of the transistor 11 and the gate of the transistor 12. With this provision, the transistors 11 and 12 constitute a current mirror circuit. Moreover, the transistor 12 and the transistor 13 are connected in series, and a joint point between the transistor 12 and the transistor 13 is connected to the gate of the transistor 13. In the example of FIG. 1, the transistors 12 and 13 have the same size as the transistor 11, so that a current i2 flowing through the transistors 12 and 13 is equal in amount to a current i1 running through the transistor 11.

The gate of the transistor 13 is connected to both the gate of the transistor 14 and the gate of the transistor 15, by which the transistors 13 through 15 constitute a current mirror circuit. In the example of FIG. 1, the transistor 14 is twice the size of the transistor 13 (twice the gate width), so that a current i3 flowing through the transistor 14 is twice as large as the current i2 flowing through the transistor 13. Further, the transistor 15 is four times the size of the transistor 13 (four times the gate width), so that a current i4 flowing through the transistor 15 is four times as large as the current i2 flowing through the transistor 13.

With this provision, the current amplification circuit of FIG. 1 generates the current i2 equal in amount to the base current i1, the current i3 twice as large as the base current i1, and the current i4 four times as large as the base current i1. The use of these currents i2 through i4 makes it possible to generate 8 different current levels corresponding to 3-bit values. By the same token, the generation of 8 electric currents being the same size, twice as large, four times as large, eight times as large, . . . , and hundred twenty eight times as large makes it possible to generate 256 different current levels corresponding to 8-bit values. The electric currents generated in such a manner may be used in a circuit portion for performing integration provided in the analog-to-digital converter of a solid-state imaging apparatus. In this integration circuit, a circuit as shown in FIG. 1 generates a desired amount of an electric current, and a capacitor is discharged with this desired current amount, thereby generating a ramp voltage having a desired slope (i.e., a voltage that decreases at a fixed rate). This ramp voltage is compared with a voltage read from the solid-state imaging device. A counter measures a time period that passes before the two voltages coincide, thereby converting the analog voltage into a digital value.

[Patent Document 1] Japanese Patent Application No. 11-161353

[Patent Document 2] Japanese Patent Application No. 2002-74997

In the circuit shown in FIG. 1, a change in the operating conditions and/or circuit conditions results in fluctuation of generated electric currents. If the power supply voltage fluctuates, for example, the voltage between the gate node and source node of each transistor changes, causing the current flowing through each transistor to fluctuate. If the threshold voltage of each transistor varies due to process variation, the current flowing through each transistor ends up varying in response to the threshold voltage. This happens even when the voltage between the gate node and source node of each transistor is maintained at a desired voltage. If there is a temperature change, further, the current flowing through each transistor changes because the drain current is related to the voltage between the gate and the source in a temperature-dependent manner.

Accordingly, a circuit as shown in FIG. 1 has difficulty supplying stable currents with sufficient accuracy when there is fluctuation in the operating conditions, circuit conditions, or the like. If the circuit shown in FIG. 1 is used in a solid-state imaging apparatus, the analog-to-digital converter will suffer a drop in conversion accuracy.

Accordingly, there is a need for a current stabilization circuit, a current stabilization method, and a solid-state imaging apparatus using such a current stabilization circuit wherein the current stabilization circuit can supply a desired current amount with sufficient stability and accuracy even if there is fluctuation in the power supply voltage, a change in the operating temperature, variation in the transistor threshold voltage, etc.

SUMMARY OF THE INVENTION

It is a general object of the present invention to provide a current stabilization circuit, a current stabilization method, and a solid-state imaging apparatus that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a current stabilization circuit, a current stabilization method, and a solid-state imaging apparatus particularly pointed out in the specification in such full, clear, concise, and exact terms as to enable a person having ordinary skill in the art to practice the invention.

To achieve these and other advantages in accordance with the purpose of the invention, the invention provides a circuit for stabilizing an electric current, which includes a constant voltage supplying circuit configured to supply a constant voltage, and a current generating circuit coupled to the constant voltage supplying circuit to generate an electric current based on a predetermined voltage responsive to the constant voltage and to adjust a current amount of the electric current to a predetermined amount by feedback control based on comparison of the predetermined voltage with a voltage appearing across a predetermined resistance responsive to the electric current.

According to another aspect of the present invention, a solid-state imaging apparatus includes a constant voltage supplying circuit configured to supply a constant voltage, a current generating circuit coupled to the constant voltage supplying circuit to generate an electric current based on a predetermined voltage responsive to the constant voltage and to adjust a current amount of the electric current to a predetermined amount by feedback control based on comparison of the predetermined voltage with a voltage appearing across a predetermined resistance responsive to the electric current, a capacitor coupled to the current generating circuit, a solid-state imaging device, an analog-to-digital conversion circuit configured to compare a pixel voltage read from the solid-state imaging device with a voltage of the capacitor decreasing through electric discharge controlled by an electric current generated by the current generating circuit, thereby to convert the pixel voltage from analog into digital.

According to another aspect of the present invention, a method of stabilizing an electric current includes the steps of supplying a constant voltage from a constant voltage supplying circuit, generating an electric current based on a predetermined voltage responsive to the constant voltage, and adjusting a current amount of the electric current to a predetermined amount by feedback control based on comparison of the predetermined voltage with a voltage appearing across a predetermined resistance responsive to the electric current.

According to at least one embodiment of the invention, a stable, constant voltage supplied by the constant voltage supplying circuit is utilized, and uses the current generating circuit to generate an electric current based on a predetermined voltage responsive to the constant voltage and to adjust a current amount of the electric current to a predetermined amount by feedback control based on comparison of the predetermined voltage with a voltage appearing across a predetermined resistance responsive to the electric current. With the electric current generated in this manner being supplied as an input to a current mirror circuit, a current amount can be maintained at a constant level even if there is fluctuation in the power supply voltage, a change in the operating temperature, fluctuation in the threshold voltages of transistors, etc.

According to at least one embodiment of the invention, the constant voltage supplying circuit is a band gap reference circuit. A voltage generated by the band gap reference circuit is theoretically equal to the band gap voltage of silicon, and is hardly affected by fluctuation in the power supply voltage, a temperature change, fluctuation in the threshold voltage due to process variation, etc. With this provision, therefore, the predetermined voltage used by the current generating circuit can be maintained at a stable, constant voltage level.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

Figure 1:
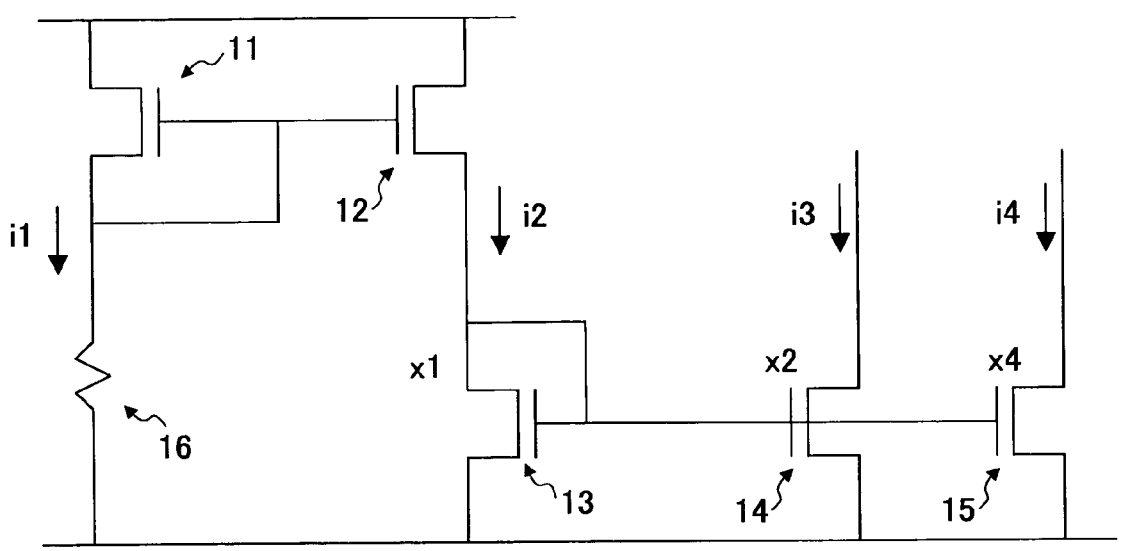
FIG. 1 is a circuit diagram showing an example of the construction of a related-art current amplification circuit.
Figure 2:
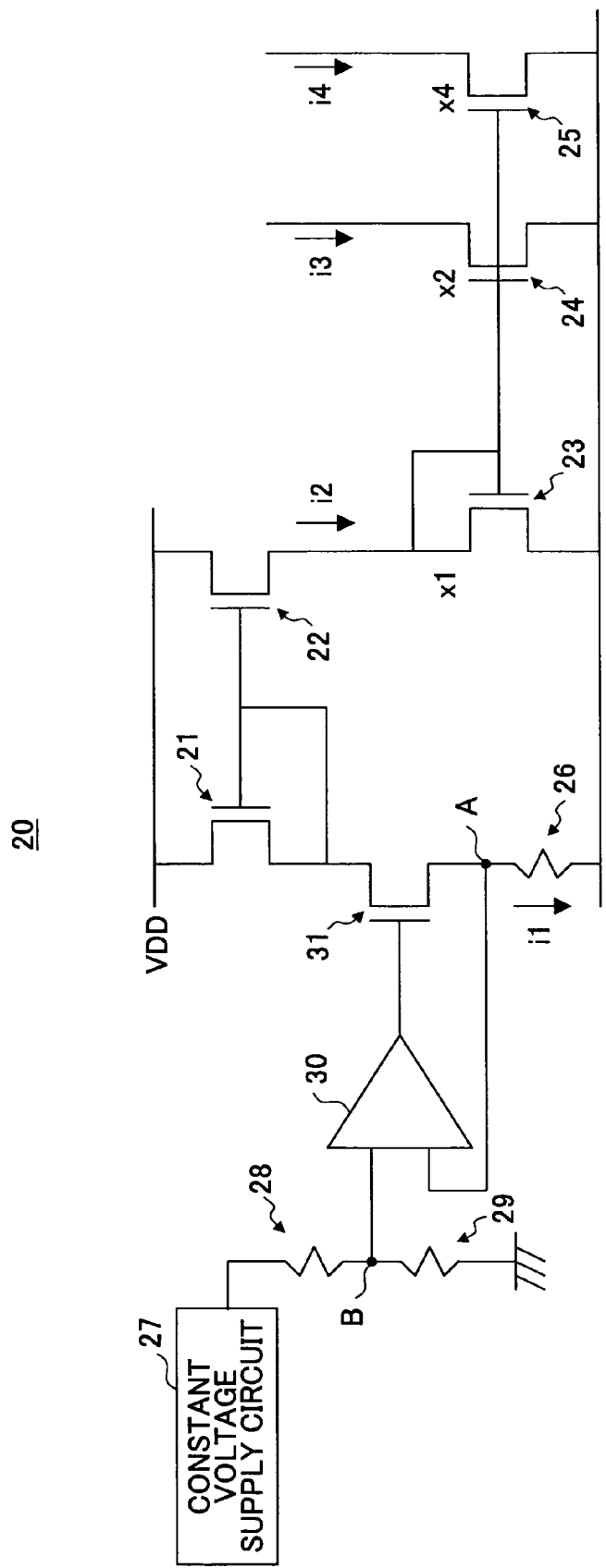
FIG. 2 is a circuit diagram showing an example of the construction of a current stabilization circuit according to the present invention.

FIG. 2 is a circuit diagram showing an example of the construction of a current stabilization circuit according to the present invention. A current stabilization circuit 20 shown in FIG. 2 includes transistors 21 through 25, a resistor 26, a constant voltage supply circuit 27, resistors 28 and 29, a differential amplifier 30, and a transistor 31.

A joint point between the transistor 21 and the transistor 31 connected in series is connected to both the gate of the transistor 21 and the gate of the transistor 22. With this provision, the transistors 21 and 22 constitute a current mirror circuit. The transistor 22 and the transistor 23 are connected in series, and a joint point between the transistor 22 and the transistor 23 is connected to the gate of the transistor 23. In the example of FIG. 2, the transistors 22 and 23 are the same size as the transistor 21, so that a current i2 flowing through the transistors 22 and 23 is equal in amount to a current i1 flowing through the transistor 21.

The gate of the transistor 23 is connected to both the gate of the transistor 24 and the gate of the transistor 25, by which the transistors 23 through 25 constitute a current mirror circuit. In the example of FIG. 2, the transistor 24 is twice the size of the transistor 23 (twice the gate width), so that a current i3 flowing through the transistor 24 is twice as large as the current i2 flowing through the transistor 23. Further, the transistor 25 is four times the size of the transistor 23 (four times the gate width), so that a current i4 flowing through the transistor 25 is four times as large as the current i2 flowing through the transistor 23.

In the current stabilization circuit according to the invention shown in FIG. 2, the constant voltage supply circuit 27 supplies a fixed voltage. The constant voltage supply circuit 27 may be configured to convey a supplied power supply voltage as it is if the power supply voltage is stable and constant. The constant voltage supply circuit 27 may be a circuit capable of supplying a stable and constant voltage independent of fluctuation of the power supply voltage if the power supply voltage exhibits such fluctuation. An example of such a circuit includes a band gap reference circuit (BGR circuit). The band gap reference circuit adds a forward-direction voltage Vbe of the pn junction having negative temperature dependency decreasing with a temperature increase to a voltage having positive temperature dependency increasing with a temperature increase generated by a differential of Vbe, thereby canceling the positive temperature dependency and the negative temperature dependency with each other to generate a voltage equal to the band gap voltage of silicon (approximately 1.2 V). The voltage generated by the band gap reference circuit is theoretically equal to the band gap voltage of silicon, thereby providing a constant voltage that is not affected by fluctuation in the power supply voltage, a temperature change, fluctuation in the threshold voltage due to process variation, etc.

Figure 3:
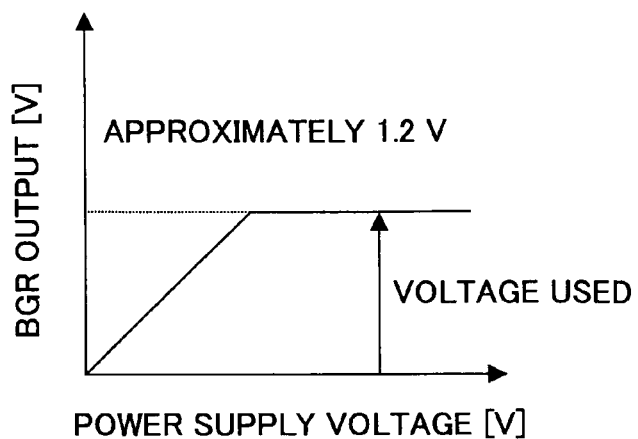
FIG. 3 is an illustrative drawing showing the characteristics of a band gap reference circuit with respect to fluctuation in the power supply voltage.

FIG. 3 is an illustrative drawing showing the characteristics of the band gap reference circuit with respect to fluctuation in the power supply voltage. As shown in FIG. 3, if the power supply voltage is above a predetermined level, the band gap reference circuit generates an output voltage that is fixed to about 1.2 V (i.e., the band gap voltage of silicon). With this provision, the output voltage of the band gap reference circuit is maintained at a stable, constant level even when the power supply voltage exhibits fluctuation.

As for temperature changes, the band gap reference circuit can be designed such that the output voltage shows only a change of 1.4 mV more or less in response to a temperature change in the range between −25 degrees Celsius and 85 degrees Celsius. That is, a fluctuation of about $1/1000$ is attained with respect to an output voltage of 1.2 V. When application to solid-state imaging apparatus is contemplated, a fluctuation less than tens of mV is sufficient for the purpose of ordinary circuit design. The use of a band gap reference circuit makes it possible to attain fluctuation significantly smaller than this target value.

In the current stabilization circuit 20 of FIG. 2, the fixed voltage supplied from the constant voltage supply circuit 27 is divided by a potential divider comprised of the resistors 28 and 29. A divided potential appearing at a node B is then applied to one of the inputs of the differential amplifier 30. The output of the differential amplifier 30 is applied to the gate of the transistor 31. The transistor 31 and the resistor 26 are connected in series, and a joint node A between the transistor 31 and the resistor 26 is coupled to the other input of of the differential amplifier 30. With this feedback control, the resistance of the transistor 31 is adjusted such that the voltage at the node A and the voltage at the node B become equal. As a result, the potential at the node A is set equal to the potential at the node B (e.g., 0.6 V).

If the potential supplied by the constant voltage supply circuit 27 is stable and constant, the potential at the node A is also stably maintained at a predetermined level. The use of a band gap reference circuit as the constant voltage supply circuit 27, for example, makes it possible to generate a predetermined voltage level at the node A that is hardly affected by fluctuation in the power supply voltage, a temperature change, fluctuation in the threshold voltage resulting from process variation, etc.

Since the voltage of the node A is maintained at the predetermined level, the current i1 flowing through the resistor 26 is stably maintained at a predetermined current amount responsive to the voltage of the node A and the resistance of the resistor 26.

A circuit portion that is comprised of the differential amplifier 30 and the transistor 31 serves to generate the current i1 having a predetermined current amount by generating a predetermined stable potential at the node A by feedback control. That is, this circuit portion has the function to generate a predetermined current amount based on a fixed potential supplied from the constant voltage supply circuit 27, i.e., the function to convert the fixed potential into the predetermined current amount.

The power supply voltage VDD supplied to the transistors 21 and 22 may fluctuate, so that the voltages between the gates and sources of these transistors may change. Even in such a case, the circuit portion described above adjusts the resistance of the transistor 31 such as to produce the current i1 having a predetermined amount, so that the currents i1 and i2 flowing through the respective transistors 21 and 22 become constant. Further, the threshold voltage of the transistors 21 and 22 may vary due to process variation, causing variation in a difference between the threshold voltage and the voltage between the gate and the source. Even in such a case, the circuit portion described above adjusts the resistance of the transistor 31 such as to produce the current i1 having a predetermined amount, so that the currents i1 and i2 flowing through the respective transistors 21 and 22 become constant. Moreover, a temperature change may change the relationship between the drain current and the voltage between the gate and the source. Even in such a case, the circuit portion described above adjusts the resistance of the transistor 31 such as to produce the current i1 having a predetermined amount, so that the currents i1 and i2 flowing through the respective transistors 21 and 22 become constant. In this manner, the current i2 is fixed to a constant current amount, so that the currents i3 and i4 generated by the current mirror circuit are also maintained at stable, constant current amounts.

The current stabilization circuit 20 of FIG. 2 described above generates a predetermined stable current amount by feedback control based on the constant voltage supplied from the constant voltage supply circuit 27. Furthermore, based on this predetermined stable current amount, the current mirror circuit can generate stable electric currents having respective amounts.

Figure 4:
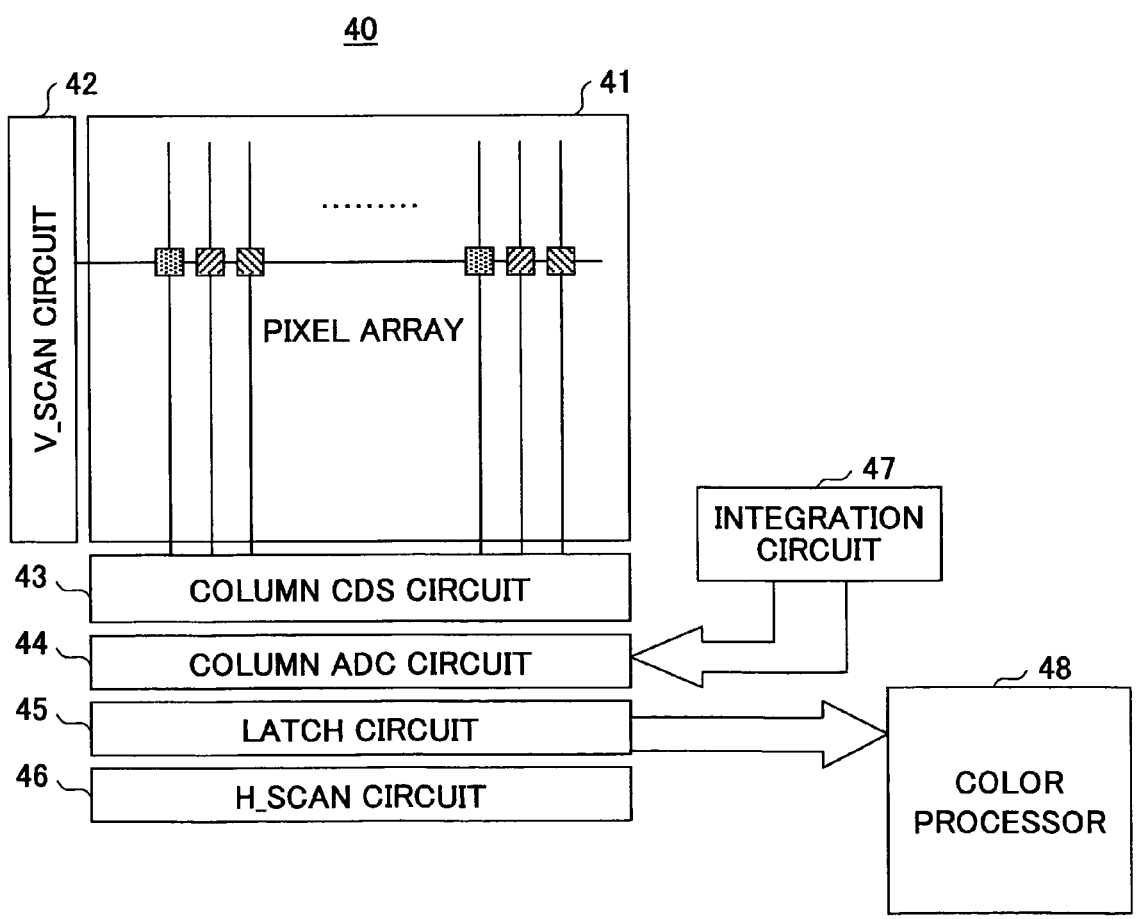
FIG. 4 is a block diagram showing an example of the construction of a solid-state imaging apparatus to which the current stabilization circuit of the present invention is applied.

FIG. 4 is a block diagram showing an example of the construction of a solid-state imaging apparatus to which the current stabilization circuit of the present invention is applied. The solid-state imaging apparatus 40 of FIG. 4 includes a pixel array 41, a V_SCAN circuit 42, a column CDS circuit 43, a column ADC circuit 44, a latch circuit 45, an H_SCAN circuit 46, an integration circuit 47, and a color processor 48. The color processor 48 may be implemented as part of the solid-state imaging apparatus 40 on the same chip, or may be implemented as a separate unit from the solid-state imaging apparatus 40 on a separate chip.

The pixel arrays 41 are a plurality of photo-diodes arranged in a matrix having rows and columns to serve as a light receiving section. Each of the photo-diodes constitutes a pixel for the imaging purpose. Incident light is subjected to optoelectronic conversion on a pixel-by-pixel basis. Electrical charge obtained by the optoelectronic conversion is accumulated in the charge accumulating section for retrieval from an exterior. The V_SCAN circuit 42 successively scans the pixel array matrix in a vertical direction (i.e., column direction) for the purpose of reading electric charge corresponding to each pixel. The column CDS circuit 43 reads an image signal from the pixel array while reducing noise by correlated double sampling, for example. The obtained image signal is then converted from an analog form into a digital signal by the column ADC circuit 44.

The latch circuit 45 stores the digital image signal obtained by the column ADC circuit 44. The H_SCAN circuit 46 generates a scanning signal for reading the digital image data stored in the latch circuit 45 successively in the horizontal direction. Provision is thus made to read the digital image data from the latch circuit 45 for provision to the color processor 48.

The color processor 48 applies various signal processing to the supplied image data, and outputs digital image data suitable for screen display. Such signal processing includes a defect pixel correction for correcting defects by processing the data of defect pixels contained in the image signal, a color interpolation for obtaining color data for each pixel based on color information corresponding to the RGB Bayer array, a shading correction for correcting lens distortion based on color data, an automatic white balance process, a gamma correction process, an edge processing process, etc.

Figure 5:
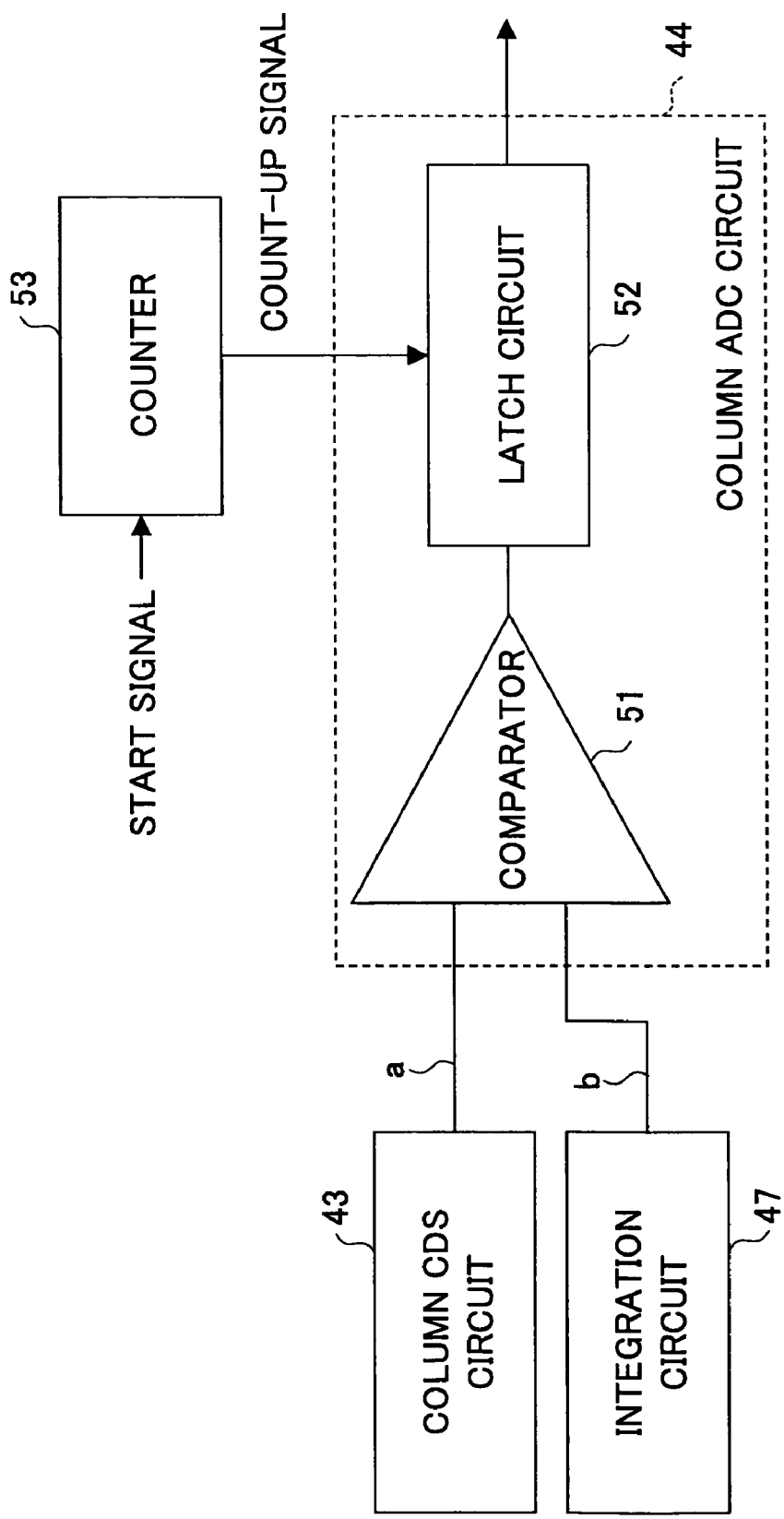
FIG. 5 is a circuit diagram showing an example of the schematic construction of a column ADC circuit.

The column ADC circuit 44 compares the voltage level of the analog signal from the column CDS circuit 43 with the voltage level of the ramp signal (i.e. a signal that decreases at a fixed rate) from the integration circuit 47, and utilizes a counter to measure a time period that passes before the two voltage levels become equal, thereby converting the analog voltage level into a digital value. It is in the integration circuit 47 for generating the ramp signal that the current stabilization circuit 20 of the present invention is used FIG. 5 is a circuit diagram showing an example of the schematic construction of the column ADC circuit 44. In FIG. 5, the column ADC circuit 44 includes a comparator 51 and a latch circuit 52. The latch circuit 52 responds to the output signal of the comparator 51 serving as a trigger to read the count of a counter 53. The counter 53 counts up in response to a start signal, and supplies the count as a count-up signal to the latch circuit 52.

The comparator 51 compares an analog signal voltage "a" indicative of a pixel value supplied from the column CDS circuit 43 with a ramp signal voltage "b" supplied from the integration circuit 47, and asserts its output when the two voltages become equal. In response to the assertion of the output of the comparator 51, the latch circuit 52 latches the count indicated by the count-up signal supplied from the counter 53.

Figure 6:
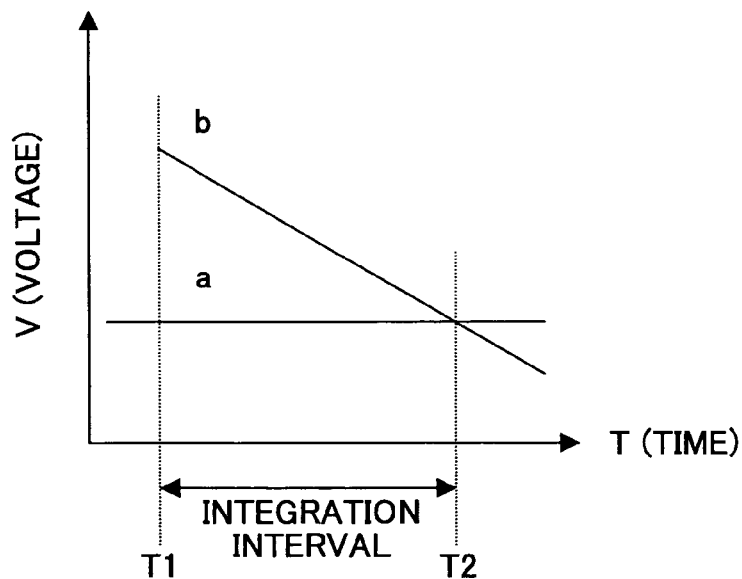
FIG. 6 is a diagram for explaining the operation of the column ADC circuit.

FIG. 6 is a diagram for explaining the operation of the column ADC circuit 44. In FIG. 6, the horizontal axis represents time, and the vertical axis represents voltage. The analog signal voltage "a" from the column CDS circuit 43 is maintained at a constant voltage level indicative of a pixel value. The ramp signal voltage "b" from the integration circuit 47 decreases linearly at a constant rate with time The counting operation of the counter 53 is started at predetermined timing T1. The count is latched at timing T2 at which the analog signal voltage "a" and the ramp signal voltage "b" coincide. Since the rate at which the ramp signal voltage "b" descends with time is known in advance, a digital value corresponding to the measured time count can represent the voltage level of the analog signal voltage "a".

Figure 7:
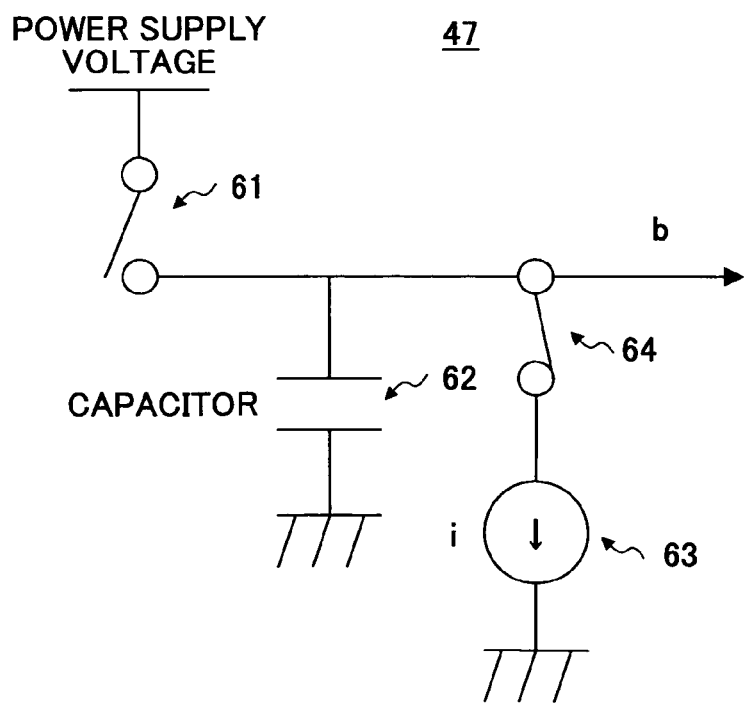
FIG. 7 is a circuit diagram showing an example of the schematic construction of an integration circuit.

FIG. 7 is a circuit diagram showing an example of the schematic construction of the integration circuit 47. The integration circuit 47 of FIG. 7 includes a switch 61, a capacitor 62, a switch 64, and a constant current source 63. First, with the switch 61 closed and the switch 64 open, electric charge is accumulated in the capacitor 62 from the power supply voltage, thereby setting the ramp signal voltage "b" to a predetermined voltage level. Then, with the switch 61 open and the switch 64 closed, discharge takes place from the capacitor 62 to the ground through the constant current source 63. When this happens, the current flowing through the constant current source 63 is constant, so that the ramp signal voltage "b" decreases linearly with time at a predetermined rate.

In the solid-state imaging apparatus 40, it is desirable to provide the function to control the time required for the analog-to-digital conversion in the column ADC circuit 44 when there is a need to change the frame rate of images or the like. Since digital representation by a counter value has its accuracy varying depending on the size of the counter value, it is preferable to discharge slowly from the capacitor 62 by taking a certain length of time and to latch a large counter value. When there is a time limitation, however, it is necessary to discharge from the capacitor 62 in a short time and to latch a counter value. In such a case, the current amount flowing through the constant current source 63 needs to be set to a desired amount with sufficient accuracy. It is for this purpose that a circuit like the current stabilization circuit 20 shown in FIG. 2 is used.

As previously described, the use of the currents i2 through i4 makes it possible to generate 8 different current levels corresponding to 3-bit values. By the same token, the generation of 8 electric currents that are the same size, twice as large, four times as large, eight times as large, and hundred twenty eight times as large makes it possible to generate 256 different current levels corresponding to 8-bit values. In this manner, a desired current amount is created with sufficient accuracy, thereby adjusting a rate at which the ramp signal voltage "b" decreases through electric discharge from the capacitor 62. This achieves accurate analog-to-digital conversion.

Further, the present invention is not limited to these embodiments, but various variations and modifications may be made without departing from the scope of the present invention.

What is claimed is:

1. A solid-state imaging apparatus, comprising:
   a constant voltage supplying circuit configured to supply a constant voltage;
   a current generating circuit coupled to said constant voltage supplying circuit to generate an electric current based on a predetermined voltage responsive to the constant voltage and to adjust a current amount of the electric current to a predetermined amount by feedback control based on comparison of the predetermined voltage with a voltage appearing across a predetermined resistance responsive to the electric current;
   a capacitor coupled to said current generating circuit;
   a solid-state imaging device;
   an analog-to-digital conversion circuit configured to convert a pixel voltage read from said solid-state imaging device from analog into digital by comparing the pixel voltage with a voltage of said capacitor decreasing through electric discharge controlled by an electric current generated by said current generating circuit.

2. The circuit as claimed in claim 1, wherein said current generating circuit includes:
   a differential amplifier having inputs thereof coupled to the voltage appearing across the predetermined resistance and to the predetermined voltage; and
   a transistor having a gate node thereof coupled to an output of said differential amplifier,
   wherein said transistor and said predetermined resistance are connected in series.

3. The circuit claimed in claim 1, wherein said constant voltage supplying circuit is configured to receive a able power supply voltage from an exterior and to output the received power supply voltage as said constant voltage.

4. The circuit claimed in claim 1, wherein said constant voltage supplying circuit is a band gap reference circuit.

5. The circuit as claimed in claim 1, further comprising a current mirror circuit configured to generate, in response to the electric current of the predetermined amount an electric current having a current amount that is a multiple of the predetermined amount.

6. The solid-state imaging apparatus as claimed in claim 1, wherein said constant voltage supplying circuit is a band gap reference circuit.

7. The solid-state imaging apparatus as claimed in claim 1, wherein said current generating circuit further includes a current mirror circuit configured to generate, in response to the electric current of the predetermined amount, an electric current having a current amount that is a multiple of the predetermined amount, which serves as the electric current controlling the electric discharge of said capacitor.

8. A circuit, comprising:
  a current generating circuit for generating a constant electric current that is defined by supplying a voltage of a constant voltage supplying circuit to a resistor, said constant voltage supplying circuit including:
  a constant voltage source; and
  a voltage controlling unit configured to control the voltage supplied to the resistor such that the voltage supplied to the resistor becomes equal through feedback control to a constant voltage supplied by said constant voltage source;
  a capacitor coupled to said current generating circuit;
  a solid-state imaging device;
  an analog-to-digital conversion circuit configured to convert a pixel voltage read from said solid-state imaging device from analog into digital by comparing the pixel voltage with a voltage of said capacitor decreasing through electric discharge controlled by the constant electric current generated by said current generating circuit.

9. A method of performing an analog-to-digital conversion for a solid-state imaging device comprising the steps of:
  supplying a constant voltage from a constant voltage supplying circuit;
  generating an electric current based on a predetermined voltage responsive to the constant voltage;
  adjusting a current amount of the electric current to a predetermined amount by feedback control based on comparison of the predetermined voltage with a voltage appearing across a predetermined resistance responsive to the electric current;
  discharging a capacitor such as to make a voltage of said capacitor decrease through electric discharge controlled by the electric current having the adjusted current amount; and
  comparing a pixel voltage read from the solid-state imaging device with the voltage of said capacitor, thereby to convert the pixel voltage from analog into digital.

* * * * *